United States Patent
Beason et al.

(10) Patent No.: US 11,959,358 B2
(45) Date of Patent: Apr. 16, 2024

(54) BLEEDING OFF A HYDRAULIC FRACTURING MANIFOLD USED IN OIL AND GAS EXTRACTION OPERATIONS

(71) Applicant: Downing Wellhead Equipment, LLC, Oklahoma City, OK (US)

(72) Inventors: Ronnie B. Beason, Lexington, OK (US); Nicholas J. Cannon, Washington, OK (US)

(73) Assignee: DOWNING WELLHEAD EQUIPMENT, LLC, Oklahoma City, OK (US)

( * ) Notice: Subject to any disclaimer, the term of this patent is extended or adjusted under 35 U.S.C. 154(b) by 0 days.

(21) Appl. No.: 18/159,990

(22) Filed: Jan. 26, 2023

(65) Prior Publication Data

US 2023/0167709 A1 Jun. 1, 2023

Related U.S. Application Data

(63) Continuation-in-part of application No. 18/158,122, filed on Jan. 23, 2023, which is a continuation of
(Continued)

(51) Int. Cl.
| | |
|---|---|
| *E21B 34/02* | (2006.01) |
| *E21B 17/00* | (2006.01) |
| *E21B 33/068* | (2006.01) |
| *E21B 41/00* | (2006.01) |
| *E21B 43/11* | (2006.01) |

(Continued)

(52) U.S. Cl.
CPC ............ *E21B 34/02* (2013.01); *E21B 17/006* (2013.01); *E21B 33/068* (2013.01); *E21B 41/00* (2013.01); *E21B 43/11* (2013.01); *E21B 43/26* (2013.01); *E21B 43/2607* (2020.05); *F16K 3/36* (2013.01); *F16N 11/00* (2013.01); *F16N 29/02* (2013.01); *F16N 2210/00* (2013.01)

(58) Field of Classification Search
CPC .......... E21B 34/02; E21B 41/00; E21B 43/11; E21B 43/26; E21B 43/2607; E21B 17/006; E21B 33/068; F16K 3/36; F16N 11/00; F16N 2210/00; F16N 2210/02; F16N 29/02; F16N 39/00; F16N 7/38; F16N 7/40
See application file for complete search history.

(56) References Cited

U.S. PATENT DOCUMENTS

| | | | |
|---|---|---|---|
| 6,397,948 B1 * | 6/2002 | Williams | E21B 33/038 114/221 A |
| 10,174,584 B2 * | 1/2019 | Kajaria | F16K 17/16 |

(Continued)

FOREIGN PATENT DOCUMENTS

NO  20171720 A1 * 10/2017 ............. E21B 33/06

OTHER PUBLICATIONS

International Search Report and Written Opinion for corresponding International Application No. PCT/US2022/081269, dated Feb. 7, 2023; 6 pages.

(Continued)

*Primary Examiner* — Daniel P Stephenson
(74) *Attorney, Agent, or Firm* — HAYNES AND BOONE, LLP

(57) ABSTRACT

An apparatus, system, and method for bleeding off a hydraulic fracturing manifold used in oil and gas extraction operations.

28 Claims, 6 Drawing Sheets

Related U.S. Application Data application No. 17/878,493, filed on Aug. 1, 2022, now Pat. No. 11,560,770, and a continuation-in-part of application No. 17/872,516, filed on Jul. 25, 2022, now Pat. No. 11,591,889, said application No. 17/872,516 is a continuation of application No. 17/548,087, filed on Dec. 10, 2021, now Pat. No. 11,396,799, said application No. 17/878,493 is a continuation of application No. 17/388,716, filed on Jul. 29, 2021, now Pat. No. 11,401,779, said application No. 17/548,087 is a continuation-in-part of application No. 16/436,189, filed on Jun. 10, 2019, now Pat. No. 11,242,950.

(60) Provisional application No. 63/304,325, filed on Jan. 28, 2022, provisional application No. 63/189,663, filed on May 17, 2021.

(51) Int. Cl.
*E21B 43/26* (2006.01)
*F16K 3/36* (2006.01)
*F16N 11/00* (2006.01)
*F16N 29/02* (2006.01)

(56) References Cited

U.S. PATENT DOCUMENTS

| | | | | |
|---|---|---|---|---|
| 10,563,778 | B2* | 2/2020 | Painter | E21B 34/00 |
| 10,711,949 | B2* | 7/2020 | Stuedal | E21B 43/013 |
| 10,724,682 | B2 | 7/2020 | Beason et al. | |
| 10,801,294 | B2* | 10/2020 | Jespersen | E21B 33/068 |
| 11,047,189 | B2* | 6/2021 | Fernandes | E21B 23/08 |
| 11,137,109 | B2* | 10/2021 | Babineaux | F16N 11/08 |
| 11,242,950 | B2 | 2/2022 | Johnson et al. | |
| 11,306,835 | B1* | 4/2022 | Dille | G05D 7/0173 |
| 11,396,799 | B2* | 7/2022 | Johnson | E21B 43/2607 |
| 11,401,779 | B2* | 8/2022 | Kuehn | F16N 39/00 |
| 11,460,368 | B2* | 10/2022 | Yeung | G01M 3/26 |
| 11,473,399 | B2 | 10/2022 | Beason et al. | |
| 11,480,027 | B2 | 10/2022 | Beason et al. | |
| 11,480,028 | B2 | 10/2022 | Beason et al. | |
| 11,560,770 | B2* | 1/2023 | Kuehn | F16K 3/36 |
| 11,591,889 | B2 | 2/2023 | Johnson et al. | |
| 11,655,926 | B2 | 5/2023 | Johnson et al. | |
| 2014/0352968 | A1* | 12/2014 | Pitcher | E21B 43/2607 |
| | | | | 166/308.1 |
| 2017/0123437 | A1* | 5/2017 | Boyd | G05D 7/0641 |
| 2017/0138144 | A1 | 5/2017 | Christopherson et al. | |
| 2017/0212535 | A1 | 7/2017 | Shelman et al. | |
| 2017/0275980 | A1* | 9/2017 | Kajaria | F16L 55/07 |
| 2017/0336022 | A1* | 11/2017 | Gouge | F16N 25/00 |
| 2018/0045331 | A1 | 2/2018 | Lopez et al. | |
| 2018/0179848 | A1* | 6/2018 | Cherewyk | E21B 47/10 |
| 2018/0283618 | A1 | 10/2018 | Cook | |
| 2019/0360636 | A1* | 11/2019 | McKim | F16N 21/00 |
| 2020/0182004 | A1* | 6/2020 | Tesla | E21B 33/0355 |
| 2020/0248529 | A1* | 8/2020 | Beason | E21B 4/003 |
| 2020/0347990 | A1* | 11/2020 | McKim | F16N 25/00 |
| 2020/0355322 | A1 | 11/2020 | Beason et al. | |
| 2021/0188616 | A1* | 6/2021 | Shock | B67D 7/36 |
| 2021/0262315 | A1* | 8/2021 | Beason | E21B 43/2607 |
| 2021/0301638 | A1* | 9/2021 | Boyd | E21B 43/26 |
| 2021/0301933 | A1* | 9/2021 | Asanoma | F16N 1/00 |
| 2021/0324706 | A1* | 10/2021 | Beason | E21B 43/26 |
| 2021/0355784 | A1 | 11/2021 | Kuehn et al. | |
| 2021/0372255 | A1* | 12/2021 | Gullickson | E21B 43/26 |
| 2023/0065605 | A1 | 3/2023 | Beason et al. | |
| 2023/0160278 | A1 | 5/2023 | Kuehn et al. | |

OTHER PUBLICATIONS

International Search Report and Written Opinion for corresponding International Application No. PCT/US2023/061352, dated May 31, 2023; 10 pages.

* cited by examiner

BLEEDING OFF A HYDRAULIC FRACTURING MANIFOLD USED IN OIL AND GAS EXTRACTION OPERATIONS

CROSS-REFERENCE TO RELATED APPLICATIONS

This application claims the benefit of the filing date of, and priority to, U.S. Patent Application No. 63/304,325, filed Jan. 28, 2022, the entire disclosure of which is hereby incorporated herein by reference.

This application is related to U.S. patent application Ser. No. 16/248,648 ("the '648 application"), filed Jan. 15, 2019, now issued as U.S. Pat. No. 10,724,682, the entire disclosure of which is hereby incorporated herein by reference.

This application is also related to U.S. patent application Ser. No. 16/938,341 ("the '341 application"), filed Jul. 24, 2020, published as U.S. Patent Application Publication No. 2020/0355322, the entire disclosure of which is hereby incorporated herein by reference.

This application is also related to U.S. patent application Ser. No. 16/855,749 ("the '749 application"), filed Apr. 22, 2020, published as U.S. Patent Application Publication No. 2020/0248529, now issued as U.S. Pat. No. 11,480,027, the entire disclosure of which is hereby incorporated herein by reference.

This application is also related to U.S. patent application Ser. No. 17/367,108 ("the '108 application"), filed Jul. 2, 2021, published as U.S. Patent Application Publication No. 2021/0332665, now issued as U.S. Pat. No. 11,473,399, the entire disclosure of which is hereby incorporated herein by reference.

This application is also related to U.S. patent application Ser. No. 18/047,085 ("the '085 application"), filed Oct. 17, 2022, the entire disclosure of which is hereby incorporated herein by reference.

This application is also related to U.S. patent application Ser. No. 17/319,854 ("the '854 application"), filed May 13, 2021, published as U.S. Patent Application Publication No. 2021/0262315, the entire disclosure of which is hereby incorporated herein by reference.

This application is also related to U.S. patent application Ser. No. 17/360,336 ("the '336 application"), filed Jun. 28, 2021, published as U.S. Patent Application Publication No. 2021/0324706, now issued as U.S. Pat. No. 11,480,028, the entire disclosure of which is hereby incorporated herein by reference.

This application is also related to U.S. patent application Ser. No. 17/388,716 ("the '716 application"), filed Jul. 29, 2021, published as U.S. Patent Application Publication No. 2021/0355784, now issued as U.S. Pat. No. 11,401,779, the entire disclosure of which is hereby incorporated herein by reference.

This application is also related to U.S. patent application Ser. No. 17/878,493 ("the '493 application"), filed Aug. 1, 2022, published as U.S. Patent Application Publication No. 2022/0364435, now issued as U.S. Pat. No. 11,560,770, the entire disclosure of which is hereby incorporated herein by reference.

This application is also a continuation-in-part of U.S. patent application Ser. No. 18/158,122 ("the '122 application"), filed Jan. 23, 2023, the entire disclosure of which is hereby incorporated herein by reference.

This application is also related to U.S. patent application Ser. No. 16/436,189 ("the '189 application"), filed Jun. 10, 2019, published as U.S. Patent Application Publication No. 2020/0386359, now issued as U.S. Pat. No. 11,242,950, the entire disclosure of which is hereby incorporated herein by reference.

This application is also related to U.S. patent application Ser. No. 17/591,321 ("the '321 application"), filed Feb. 2, 2022, published as U.S. Patent Application Publication No. 2022/0154866, the entire disclosure of which is hereby incorporated herein by reference.

This application is also related to U.S. patent application Ser. No. 17/548,087 ("the '087 application"), filed Dec. 10, 2021, now issued as U.S. Pat. No. 11,396,799, the entire disclosure of which is hereby incorporated herein by reference.

This application is also a continuation-in-part of U.S. patent application Ser. No. 17/872,516 ("the '516 application"), filed Jul. 25, 2022, published as U.S. Patent Application Publication No. 2022/0356794, the entire disclosure of which is hereby incorporated herein by reference.

BACKGROUND

This application relates generally to oil and gas hydraulic fracturing operations and, more particularly, to an apparatus, system, and method for bleeding off a hydraulic fracturing manifold used in oil and gas extraction operations.

DETAILED DESCRIPTION

Figure 1:
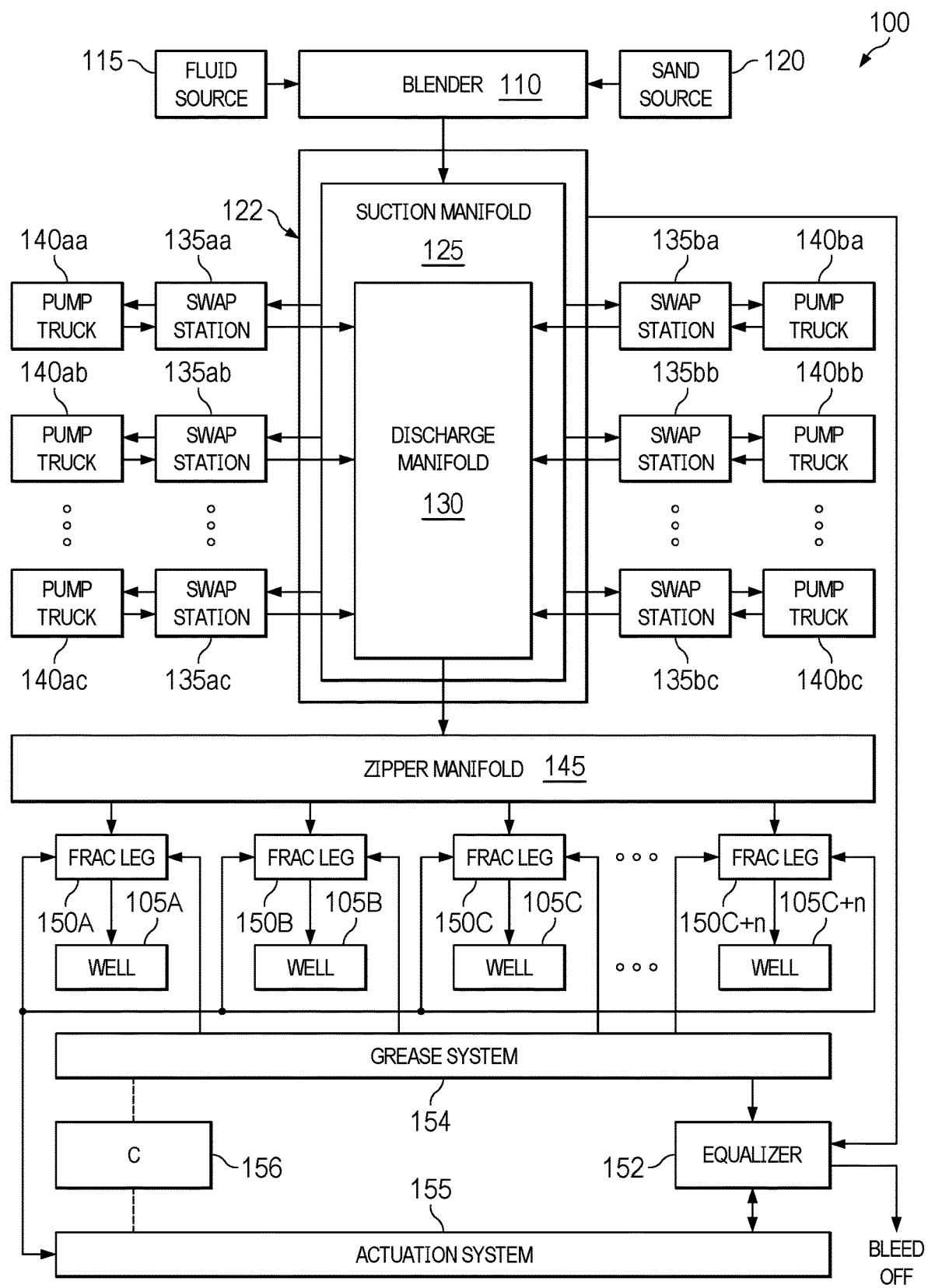
FIG. 1 is a diagrammatic illustration of a hydraulic fracturing system operable to hydraulically fracture one or more oil and gas wells, according to one or more embodiments.

Referring to FIG. 1, in an embodiment, a hydraulic fracturing system 100 for hydraulically fracturing wells 105A through 105C+n is illustrated, which hydraulic fracturing system 100 includes: a blender 110 adapted to mix fluid from a fluid source 115 with sand from a sand source 120 to produce hydraulic fracturing fluid; a hydraulic fracturing manifold, which is, includes, or is part of, a missile 122 including a suction manifold 125 and a discharge manifold 130, the suction manifold 125 being adapted to receive the hydraulic fracturing fluid from the blender 110; a plurality of swap stations 135*aa* though 135*bc,* each adapted to communicate the hydraulic fracturing fluid from the suction manifold 125 to a corresponding pump truck 140*aa* through 140*bc,* and, after pressurization by the corresponding pump truck 140*aa* through 140*bc,* to communicate the pressurized hydraulic fracturing fluid from the corresponding pump truck 140*aa* through 140*bc* to the discharge manifold 130; a hydraulic fracturing manifold, which is, includes, or is part of, a zipper manifold 145 adapted to communicate the pressurized hydraulic fracturing fluid from the discharge manifold 130 to a plurality of hydraulic fracturing legs (or "frac legs") 150A through 150C+n, each of which is adapted to communicate the pressurized hydraulic fracturing fluid from the zipper manifold 145 to a corresponding one of the wells 105A through 105C+n; and an equalizer 152 adapted to depressurize (at least partially) the missile 122 before, during, or after a hydraulic fracturing operation.

In some instances, two or more of the frac legs 150A through 150C+n may be utilized simultaneously to perform a "simul-frac" operation in which a corresponding two or more of the wells 105A through 105C+n are hydraulically fractured at the same time with hydraulic fracturing fluid provided via the missile 122 and the zipper manifold 145. In other instances, one of the frac legs 150A through 150C+n may be utilized individually to perform a hydraulic fracturing operation in which a corresponding one of the wells 105A through 105C+n is hydraulically fractured with hydraulic fracturing fluid provided via the missile 122 and the zipper manifold 145. In any case, the equalizer 152 provides an automated manner in which to bleed fracturing pressure from the missile 122, as will be described in further detail below. This can be accomplished by manually cracking a plug valve to bleed pressure off. However, due to a lack of greasing, many such valves must be discarded after every job.

In one or more embodiments, the system 100 is or includes one or more components shown and described in the '648 application, the '341 application, the '749 application, the '108 application, the '085 application, the '854 application, the '336 application, the '716 application, the '493 application, the '122 application, the '189 application, the '321 application, the '087 application, the '516 application, or any combination thereof. For example, in one or more embodiments, each of the swap stations 135*aa* through 135*bc* may be or include one or more components shown and described in the '716 application, the '493 application, the '122 application, the '189 application, the '321 application, the '087 application, the '516 application, or any combination thereof. For another example, in one or more embodiments, each of the pump trucks 140*aa* through 140*bc* may be or include one or more components shown and described in the '716 application, the '493 application, the '122 application, the '189 application, the '321 application, the '087 application, the '516 application, or any combination thereof.

Although shown in FIG. 1 as including the swap stations 135*aa* through 135*ac* and the corresponding pumps trucks 140*aa* through 140*ac,* the hydraulic fracturing system 100 may additionally (or alternatively) include one or more additional swap stations between the swap stations 135*ab* and 135*ac,* together with one or more additional corresponding pump trucks between the pump trucks 140*ab* and 140*ac.* Likewise, although shown in FIG. 1 as including the swap stations 135*ba* through 135*bc* and the corresponding pumps trucks 140*ba* through 140*bc,* the hydraulic fracturing system 100 may additionally (or alternatively) include one or more additional swap stations between the swap stations 135*bb* and 135*bc,* together with one or more additional corresponding pump trucks between the pump trucks 140*bb* and 140*bc.*

A grease system 154 is adapted to communicate lubricating grease to various components of the frac legs 150A through 150C+n, including, for example, pump-down valves, master valves, and zipper valves associated with each of the frac legs 150A through 150C+n. Additionally, or alternatively, the grease system 154 may optionally be adapted to communicate lubricating grease to one or more components of the equalizer 152, as will be described in further detail below. In one or more embodiments, the grease system 154 is or includes one or more components shown and described in the '648 application, the '341 application, the '749 application, the '108 application, the '085 application, the '854 application, the '336 application, the '716 application, the '493 application, the '122 application, or any combination thereof. Alternatively, the grease system 154 may be omitted from the hydraulic fracturing system 100.

An actuation system 155 is adapted to actuate various components of the frac legs 150A through 150C+n, including, for example, the pump-down valves, the master valves, and the zipper valves associated with each of the frac legs 150A through 150C+n. Additionally, the actuation system 155 is adapted to actuate one or more components of the equalizer 152, as will be described in further detail below. In one or more embodiments, the actuation system 155 is or includes one or more components of the hydraulic manifold 230 and the hydraulic power unit ("HPU") 235 shown and described in the '749 application, the '108 application, the '085 application, the '854 application, and the '336 application. In addition, or instead, the actuation system 155 may utilize another type of mechanical actuation such as, for example, pneumatic, electric, the like, etc.

A controller 156 is adapted to control the grease system 154, the actuation system 155, the frac legs 150A through 150C+n, or any combination thereof. In one or more embodiments, the controller 156 is or includes a non-transitory computer readable medium and one or more processors adapted to execute instructions stored on the non-transitory computer readable medium. In one or more embodiments, the controller 156 is located on-site at the well site. Alternatively, the controller 156 may be located remotely from the well site. In one or more embodiments, the controller 156 includes a plurality of controllers. In one or more embodiments, the controller 156 includes a plurality of controllers, with one or more controllers located on-site at the well site and/or one or more other controllers located remotely from the well site. In one or more embodiments, the controller 156 is, includes, or is part of, one or more controllers, sub-controllers, nodes, components, systems, etc. described and illustrated in one or more of the following applications: the '648 application, the '341 application, the '749 application, the '108 application, the '085 application, the '854 application, the '336 application, the '716 application, the '493 application, the '122 application, the '189 application, the '321 application, the '087 application, the '516 application, or any combination thereof.

Figure 2:
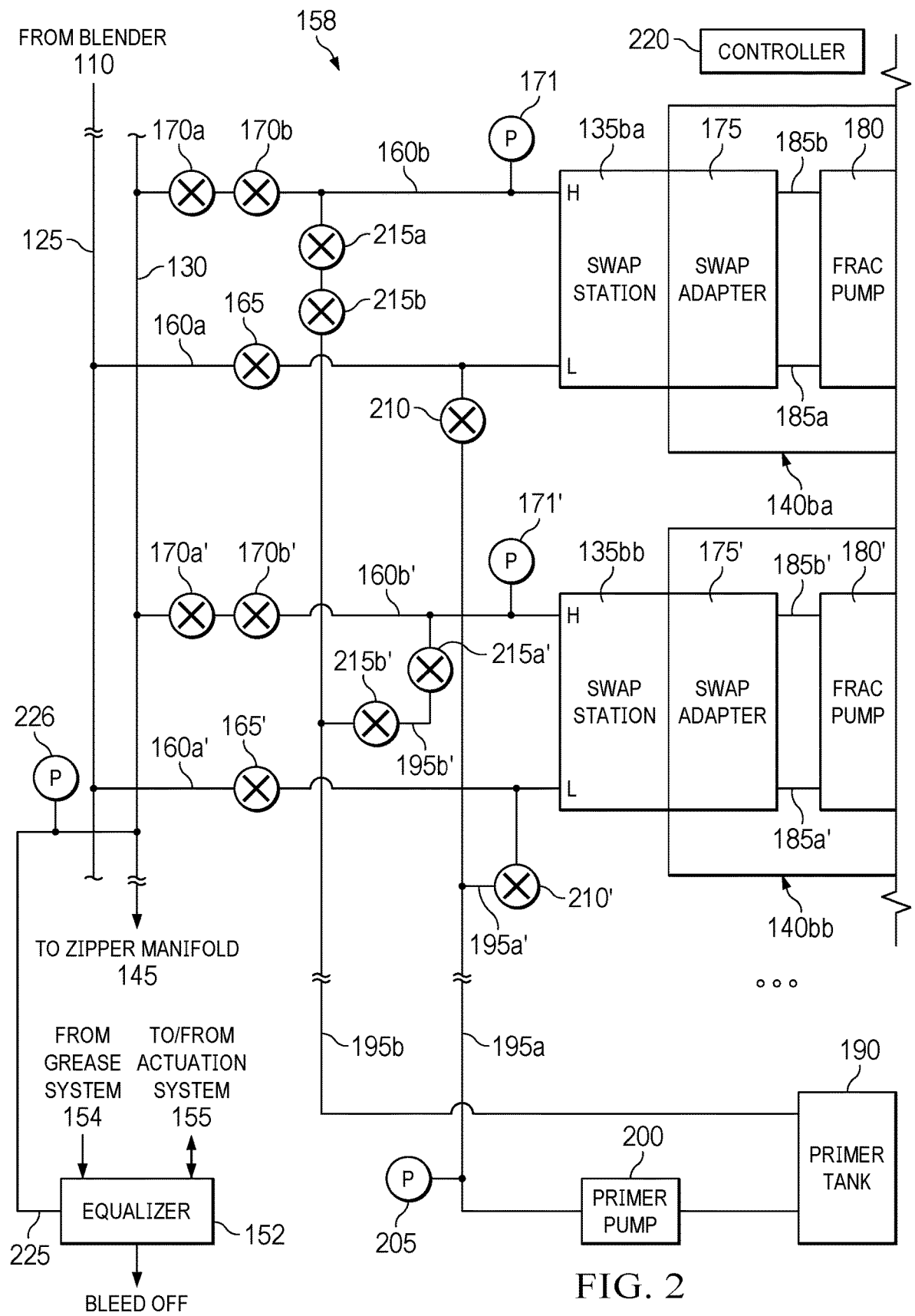
FIG. 2 is a diagrammatic illustration of a portion of the hydraulic fracturing system of FIG. 1, said portion including a hot swappable fracturing pump system, according to one or more embodiments.

Referring to FIG. 2, with continuing reference to FIG. 1, in an embodiment, the hydraulic fracturing system 100 includes a hot swappable fracturing pump system 158, which hot swappable fracturing pump system 158 includes the swap stations 135*ba* and 135*bb,* and the corresponding pump trucks 140*ba* and 140*bb.* In one or more embodiments, the hot swappable fracturing pump system 158 is or includes one or more components shown and described in the '189 application, the '321 application, the '087 application, the '516 application, or both. The swap station 135*ba* is connected to, and adapted to be in fluid communication with, the suction manifold 125 via a suction conduit 160*a*. The suction conduit 160*a* includes a valve 165 that controls the communication of fluid between the suction manifold 125 and the swap station 135*ba*. In one or more embodiments, the valve 165 is a gate valve. Additionally, the suction conduit 160*a* may include another valve such as, for example, a check valve, in addition to the valve 165. Likewise, the swap station 135*ba* is connected to, and adapted to be in fluid communication with, the discharge manifold 130 via a discharge conduit 160*b*. The discharge conduit 160*b* includes a pair of valves 170*a-b* that control the communication of fluid between the swap station 135*ba* and the discharge manifold 130. In one or more embodiments, the valves 170*a-b* are gate valves. Additionally, the discharge conduit 160*b* may include another valve such as, for example, a check valve, in addition to the valves 170*a-b*. Alternatively, in one or more embodiments, one of the valves 170*a-b* is a check valve. The discharge conduit 160*b* also includes a pressure sensor 171 that detects a discharge pressure exiting the swap station 135*ba*.

The pump truck 140*ba* includes a swap adapter 175 and a fracturing pump 180. The fracturing pump 180 is connected to, and adapted to be in fluid communication with, the swap adapter 175 via a suction conduit 185*a*. Likewise, the fracturing pump 180 is connected to, and adapted to be in fluid communication with, the swap adapter 175 via a discharge conduit 185*b*. In one or more embodiments, the suction conduit 185*a*, the discharge conduit 185, or both is/are or include(s) flexible conduit(s) (e.g., flexible hose(s)). In addition, or instead, the suction conduit 185*a*, the discharge conduit 185, or both may be or include rigid conduit(s), swivel(s) (e.g., chiksan swivel joints), both rigid conduit(s) and swivel(s), the like, or any combination thereof. The swap adapter 175 of the pump truck 140*ba* is detachably connectable to the swap station 135*ba*, as shown in FIG. 2; when so detachably connected: fluid communication is established between the suction conduit 160*a* and the suction conduit 185*a*; and fluid communication is established between the discharge conduit 185*b* and the discharge conduit 160*b*. In one or more embodiments, the swap adapter 175 includes, or is part of, the swap station 135*ba*.

The hot swappable fracturing pump system 158 also includes a primer tank 190 connected to, and adapted to be in fluid communication with, the suction conduit 160*a* (at a location between the swap station 135*ba* and the valve 165) via a primer conduit 195*a*. The primer conduit 195*a* includes a primer pump 200, a pressure sensor 205, and a valve 210. The primer pump 200 is adapted to pump fluid from the primer tank 190 to the suction conduit 160*a* via the primer conduit 195*a*. The pressure sensor 205 detects a discharge pressure exiting the primer pump 200. The valve 210 controls the communication of fluid between the primer tank 190 and the suction conduit 160*a* (via the primer conduit 195*a*). In one or more embodiments, the valve 210 is a gate valve. Additionally, the primer conduit 195*a* may include another valve such as, for example, a check valve, in addition to the valve 210. Likewise, the primer tank 190 is connected to, and adapted to be in fluid communication with, the discharge conduit 160*b* (at a location between the swap station 135*ba* and the valves 170*a-b*) via a primer conduit 195*b*. The primer conduit 195*b* includes a pair of valves 215*a-b* that control the communication of fluid between the discharge conduit 160*b* and the primer tank 190 (via the primer conduit 195*b*). In one or more embodiments, the valves 215*a-b* are gate valves. Additionally, the primer conduit 195*b* may include another valve such as, for example, a check valve, in addition to the valves 215*a-b*. Alternatively, in one or more embodiments, one of the valves 215*a-b* is a check valve. Although the hot swappable fracturing pump system 158 is described as including the primer tank 190 and the primer pump 200, the primer tank 190, the primer pump 200, or both may instead be omitted in favor of an existing fluid vessel (and, optionally, an associated pump or valve) on the well site, to which existing fluid vessel the primer fluid conduits 195*a-b* are connected.

The swap station 135*bb* is connected to, and adapted to be in fluid communication with, the suction manifold 125 via a suction conduit 160*a'*. The suction conduit 160*a'* includes a valve 165' that controls the communication of fluid between the suction manifold 125 and the swap station 135*bb*. In one or more embodiments, the valve 165' is a gate valve. Additionally, the suction conduit 160*a'* may include another valve such as, for example, a check valve, in addition to the valve 165'. Likewise, the swap station 135*bb* is connected to, and adapted to be in fluid communication with, the discharge manifold 130 via a discharge conduit 160*b'*. The discharge conduit 160*b'* includes a pair of valves 170*a-b'* that control the communication of fluid between the swap station 135*bb* and the discharge manifold 130. In one or more embodiments, the valves 170*a-b'* are gate valves. Additionally, the discharge conduit 160*b'* may include another valve such as, for example, a check valve, in addition to the valves 170*a-b'*. Alternatively, in one or more embodiments, one of the valves 170*a-b'* is a check valve. The discharge conduit 160*b'* also includes a pressure sensor 171' that detects a discharge pressure exiting the swap station 135*bb*.

The pump truck 140*bb* includes a swap adapter 175' and a fracturing pump 180'. The fracturing pump 180' is connected to, and adapted to be in fluid communication with, the swap adapter 175' via a suction conduit 185*a'*. Likewise, the fracturing pump 180' is connected to, and adapted to be in fluid communication with, the swap adapter 175' via a discharge conduit 185*b'*. The swap adapter 175' of the pump truck 140*bb* is detachably connectable to the swap station 135*bb*, as shown in FIG. 2; when so detachably connected: fluid communication is established between the suction conduit 160*a'* and the suction conduit 185*a'*; and fluid communication is established between the discharge conduit 185*b'* and the discharge conduit 160*b'*.

The primer tank 190 of the hot swappable fracturing pump system 158 is also connected to, and adapted to be in fluid communication with, the suction conduit 160*a'* (at a location between the swap station 135*bb* and the valve 165') via the primer conduit 195*a* and a primer conduit 195*a'*. The primer conduit 195*a'* includes a valve 210'. The primer pump 200 is adapted to pump fluid from the primer tank 190 to the suction conduit 160*a'* via the primer conduit 195*a* and the primer conduit 195*a'*. The valve 210' controls the communication of fluid between the primer tank 190 and the suction conduit 160*a'* (via the primer conduit 195*a* and the primer conduit 195*a'*). In one or more embodiments, the valve 210' is a gate valve. Additionally, the primer conduit 195*a'* may include another valve such as, for example, a check valve, in addition to the valve 210'. Likewise, the primer tank 190 is connected to, and adapted to be in fluid communication with, the discharge conduit 160*b'* (at a location between the swap station 135*bb* and the valves 170*a-b'*) via the primer conduit 195 and a primer conduit 195*b'*. The primer conduit 195*b'* includes a pair of valves 215*a-b'* that control the communication of fluid between the discharge conduit 160*b'* and the primer tank 190 (via the primer conduit 195*b* and the primer conduit 195*b'*). In one or more embodiments, the valves 215*a-b'* are gate valves. Additionally, the primer conduit 195*b'* may include another valve such as, for example, a check valve, in addition to the valves 215*a-b'*. Alternatively, in one or more embodiments, one of the valves 215*a-b'* is a check valve.

A controller 220 is adapted to send control signals to, and receive feedback (e.g., position feedback) from, the swap station 135ba, the valve 165, the valve 170a, the valve 170b, the fracturing pump 180, the primer pump 200, the valve 210, the valve 215a, the valve 215b, the swap station 135bb, the valve 165', the valve 170a', the valve 170b', the fracturing pump 180', the valve 210', the valve 215a', the valve 215b', or any combination thereof. Additionally, the controller 220 is adapted to receive pressure readings from the pressure sensor 171, the pressure sensor 205, the pressure sensor 171', or any combination thereof. In one or more embodiments, the controller 220 is or includes a non-transitory computer readable medium and one or more processors adapted to execute instructions stored on the non-transitory computer readable medium. In one or more embodiments, the controller 220 is located on-site at the well site. For example, the controller 220 may be part of the swap station 135ba. For another example, the controller 220 may be part of the swap station 135bb. For yet another example, the controller 220 may be part of the primer pump 200. Alternatively, the controller 220 may be located remotely from the well site. In one or more embodiments, the controller 220 includes a plurality of controllers. In one or more embodiments, the controller 220 includes a plurality of controllers, with one or more controllers located on-site at the well site (e.g., as part of the swap station 135ba, the swap station 135bb, the primer pump 200, or any combination thereof) and/or one or more other controllers located remotely from the well site. In one or more embodiments, the controller 220 is, includes, or is part of, one or more controllers, sub-controllers, nodes, components, systems, etc. described and illustrated in one or more of the following applications: the '648 application, the '341 application, the '749 application, the '108 application, the '085 application, the '854 application, the '336 application, the '716 application, the '493 application, the '122 application, the '189 application, the '321 application, the '087 application, the '516 application, or any combination thereof.

In one or more embodiments, the controller 220 is, includes, or is part of the controller 156. In such embodiment(s), in addition to communicating lubricating grease to the various components of the frac legs 150A through 150C+n and the one or more components of the equalizer 152, the grease system 154 may be further adapted to communicate lubricating grease to one or more components of the hot swappable fracturing pump system 158, such as, for example, the valves 165, 170a-b, 210, 215a-b, 165', 170a-b', 210', 215a-b', or any combination thereof. Furthermore, in such embodiment(s), in addition to actuating the various components of the frac legs 150A through 150C+n and the one or more components of the equalizer 152, the actuation system 155 may be further adapted to actuate one or more components of the hot swappable fracturing pump system 158, such as, for example, the valves 165, 170a-b, 210, 215a-b, 165', 170a-b', 210', 215a-b', or any combination thereof.

In a first operational state or configuration of the hot swappable fracturing pump system 158: the pump truck 140ba is not connected to the swap station 135ba via the swap adapter 175; the pump truck 140bb is connected to the swap station 135bb via the swap adapter 175'; and the fracturing pump 180' of the pump truck 140bb draws fluid from the suction manifold 125 and discharges pressurized fluid to the discharge manifold 130. More particularly, the valves 210' and 215a-b' are closed and the valve 165' is opened to permit fluid to be drawn from the suction manifold 125 by the fracturing pump 180' (via the suction conduit 160a', the valve 165', the swap station 135bb, the swap adapter 175', and the suction conduit 185a'). Additionally, the valves 170a-b' are opened to permit pressurized fluid to be discharged into to the discharge manifold 130 by the fracturing pump 180' (via the discharge conduit 185b', the swap adapter 175', the swap station 135bb, the discharge conduit 160b', and the valves 170a-b'). The valves 165, 170a-b, 210, and 215a-b corresponding to the swap station 135ba are closed in the first operational state or configuration.

Subsequently, in a second operational state or configuration of the hot swappable fracturing pump system 158: the pump truck 140ba is connected to the swap station 135ba via the swap adapter 175, as shown in FIG. 2; and the fracturing pump 180 is primed by the primer pump 200 using fluid from the primer tank 190. More particularly, the valve 210 is opened to permit the primer pump 200 to supply fluid from the primer tank 190 to the fracturing pump 180 (via the primer conduit 195a, the valve 210, the suction conduit 160a, the swap station 135ba, the swap adapter 175, and the suction conduit 185a). Additionally, the valves 215a-b are opened to permit circulation of fluid from the fracturing pump 180 back to the primer tank 190 during the priming process (via the discharge conduit 185b, the swap adapter 175, the swap station 135ba, the discharge conduit 160b, the primer conduit 195b, and the valves 215a-b). While the hot swappable fracturing pump system 158 transitions from the first operational state or configuration to the second operational state or configuration, the fracturing pump 180' of the pump truck 140bb continues to draw fluid from the suction manifold 125 and discharge pressurized fluid to the discharge manifold 130, as described above.

Subsequently, in a third operational state or configuration of the hot swappable fracturing pump system 158, once the fracturing pump 180 is fully primed (as confirmed by pressure readings from the pressure sensors 171 and 205), the fracturing pump 180 of the pump truck 140ba is brought on line to draw fluid from the suction manifold 125 and discharge pressurized fluid to the discharge manifold 130. More particularly, the valve 165 is opened and the valve 210 is closed to permit the fracturing pump 180 to draw fluid from the suction manifold 125 (via the suction conduit 160a, the valve 165, the swap station 135bb, the swap adapter 175, and the suction conduit 185a). In one or more embodiments, the valve 165 is opened before the valve 210 is closed. In one or more embodiments, the valves 165 and 210 are simultaneously opened and closed, respectively. Additionally, the valves 170a-b are opened and the valves 215a-b are closed to permit the fracturing pump 180 to discharge pressurized fluid to the discharge manifold 130 (via the discharge conduit 185, the swap adapter 175, the swap station 135ba, the discharge conduit 160b, and the valves 170a-b). In one or more embodiments, the valves 170a-b are opened before the valves 215a-b are closed. In one or more embodiments, the valves 170a-b and 215a-b are simultaneously opened and closed, respectively. While the hot swappable fracturing pump system 158 transitions from the second operational state or configuration to the third operational state or configuration, the fracturing pump 180' of the pump truck 140bb continues to draw fluid from the suction manifold 125 and discharge pressurized fluid to the discharge manifold 130, as described above.

Finally, in a fourth operational state or configuration of the hot swappable fracturing pump system 158, the fracturing pump 180' of the pump truck 140bb is brought off line for maintenance and/or repair. More particularly, the fracturing pump 180' is ramped down, the valves 170a-b' are closed, and the valves 215*a-b'* are opened to bleed off residual pressure in the discharge conduits 160*b'* and 185*b'* to the primer tank 190. Additionally, the valve 165' is closed, and, optionally, the valve 210' is opened to bleed off residual pressure in the suction conduits 160*a'* and 185*a'* to the primer tank 190. Once the residual pressure in the discharge conduits 160*b'* and 185*b'* and, optionally, the suction conduits 160*a'* and 185*a'*, is bled off to the primer tank 190, the valves 210' and 215*a-b'* are closed and the swap adapter 175' of the pump truck 140*bb* is disconnected from the swap station 135*bb*. While the hot swappable fracturing pump system 158 transitions from the third operational state or configuration to the fourth operational state or configuration, the fracturing pump 180 of the pump truck 140*ba* continues to draw fluid from the suction manifold 125 and discharge pressurized fluid to the discharge manifold 130, as described above. A replacement pump truck substantially identical to the pump truck 140*bb* with a replacement fracturing pump substantially identical to the fracturing pump 180' may subsequently be connected to the swap station 135*bb*, via a replacement swap adapter substantially identical to the swap adapter 175', and brought on line in a manner similar to that described above with respect to the pump truck 135*ba* and the fracturing pump 180.

Although described as including the swap stations 135*ba* and 135*bb*, and the corresponding pump trucks 140*ba* and 140*bb*, the hot swappable fracturing pump system 158 may additionally or alternatively include any other combination of the swap stations 135*aa* through 135*bc*, and the corresponding pump trucks 140*aa* and 140*bc*, together with the primer tank 190, the primer pump 100, corresponding conduits substantially identical to the conduits 160*a-b* and 195*a-b* (or 195*a-b'*), corresponding valves substantially identical to the valves 165, 170*a-b*, 210, and 215*a-b* (or 165', 170*a-b'*, 210', and 215*a-b'*), and corresponding pressure sensors substantially identical to the pressure sensors 171 (or 171') and 205. The operation of the various corresponding components of such a system would be substantially identical to that described above with respect to the hot swappable fracturing pump system 158 shown in FIG. 2 and, therefore, will not be described in further detail.

Referring still to FIG. 2, in an embodiment, the equalizer 152 is connected to, and adapted to be in fluid communication with, the discharge manifold 130 via an equalizer conduit 225 (and/or, optionally, the conduit(s) 160*b*, 160*b'*/195*b*, 160*b'*, or 160*b*/195*b'*). Additionally, or alternatively, the equalizer 152 may be connected to, and adapted to be in fluid communication with, the suction manifold 125 via the equalizer conduit 225 (or another equalizer conduit; and/or, optionally, the conduit(s) 160*a*, 160*a*/195*a*, 160*a'*, or 160*a'*/195*a'*). In one or more embodiments, a pressure sensor 226 is adapted to communicate pressure readings to the controller 156, the controller 220, or both. The equalizer 152 is actuable by the actuation system 155 to bleed residual pressure from the discharge manifold 130 (and/or the suction manifold 125), as will be described in further detail below. Additionally, before, during, or after such actuation, the equalizer 152 may optionally be adapted to receive grease from the grease system 154, as will be described in further detail below. Alternatively, the grease system 154 may be omitted, or at least not connected to the equalizer 152.

In some embodiments, rather than being separately connected to, and in fluid communication with, the discharge manifold 130 (and/or the suction manifold 125), the equalizer 152 (or another equalizer substantially identical to the equalizer 152) replaces the valves 170*a-b*, 215*a-b*, 170*a-b'*, or 215*a-b'* as part of the corresponding conduit 160*b*, 195*b*, 160*b'*, or 195*b'* (and/or the valve 165, 210, 165', or 210' as part of the corresponding conduit 160*a*, 195*a*, 160*a'*, or 195*a'*), and the residual pressure in the discharge manifold 130 (and/or the suction manifold 125) is bled to the primer tank 190 via the conduit 195*b* (and/or the conduit 195*a*).

Figure 3:
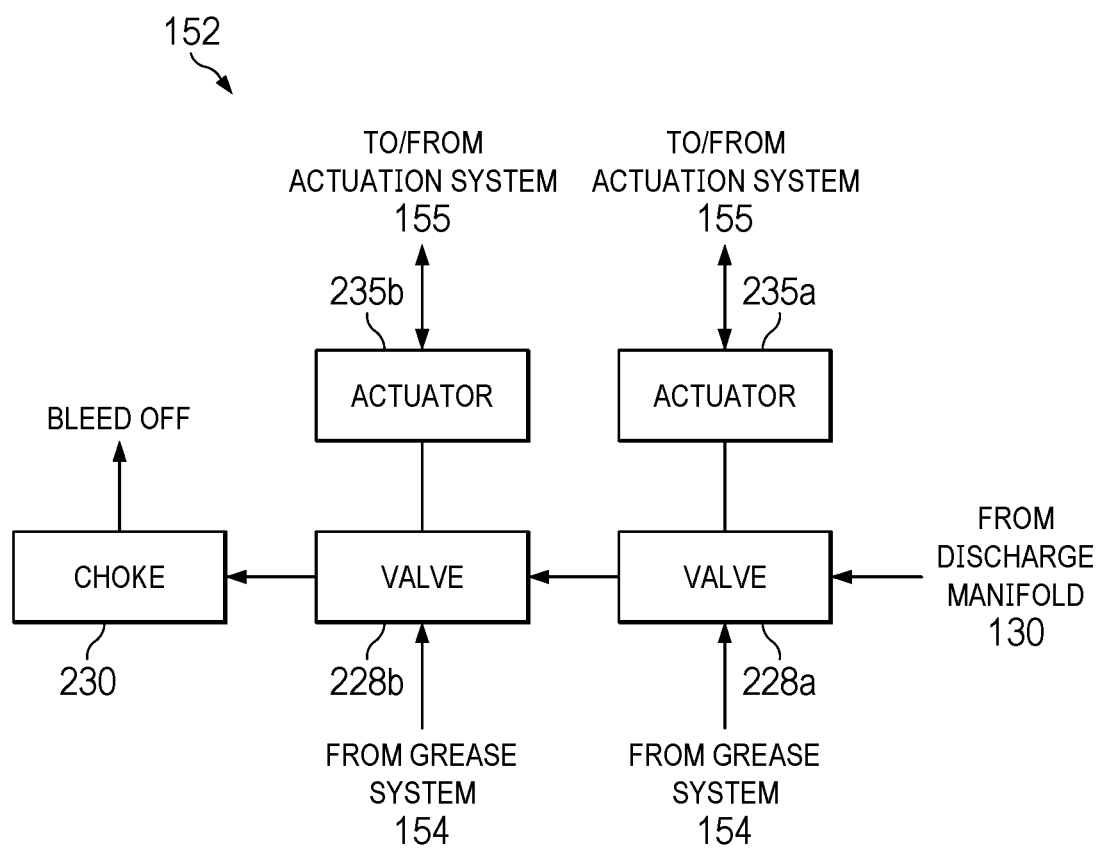
FIG. 3 is a diagrammatic illustration of an equalizer of the hydraulic fracturing system of FIGS. 1 and 2, according to one or more embodiments.

Referring to FIG. 3, with continuing reference to FIG. 2, in an embodiment, the equalizer 152 includes a pair of valves 228*a-b*, a choke (or baffle) 230, and a pair of actuators 235*a-b*. The valves 228*a-b* are actuable by the actuation system 155, via the actuators 235*a-b*, respectively, to control the bleeding off of pressure from the discharge manifold 130 (and/or the suction manifold 125). In one or more embodiments, one of the valves 228*a-b* and the corresponding one of the actuators 235*a-b* may be omitted. Before, during, or after such actuation, the valves 228*a-b* may optionally be lubricated by the grease system 154. In one or more embodiments, the valves 228*a-b* are plug valves. Additionally, the equalizer 152 may include another valve such as, for example, a check valve, in addition to the valves 228*a-b*. Alternatively, in one or more embodiments, one of the valves 228*a-b* is a check valve. The choke 230 is adapted to slow down the bleed off of pressure from the discharge manifold 130 (and/or the suction manifold 125). Although shown downstream of the valves 228*a-b*, the choke 230 may instead be positioned between the valves 228*a-b* or upstream of the valves 228*a-b*. Alternatively, in one or more embodiments, the choke 230 may be omitted.

In operation, the bleed process includes opening the valves 228*a-b* to allow pressure from the discharge manifold 130 (and/or the suction manifold 125) to bleed off. Due to the closed loop control of the valves 228*a-b* by the actuation system 155, the pressure feedback from the pressure sensor 226 (or the pressure sensor 171, 171' or 205), and, optionally, the choke 230 which slows the bleed, the bleed off can be precisely controlled to stop at a desired pressure setpoint. For instance, the discharge manifold 130 (and/or the suction manifold 125) can be bled off to equalize the pressure therein to any given pressure (e.g., well pressure, atmospheric pressure, another pressure, etc.) if so desired. To facilitate such pressure equalization, the valves 228*a-b* are equipped with position feedback and pressure feedback is provided from the given pressure environment to which the discharge manifold 130 (and/or the suction manifold 125) is to be equalized.

Figure 4:
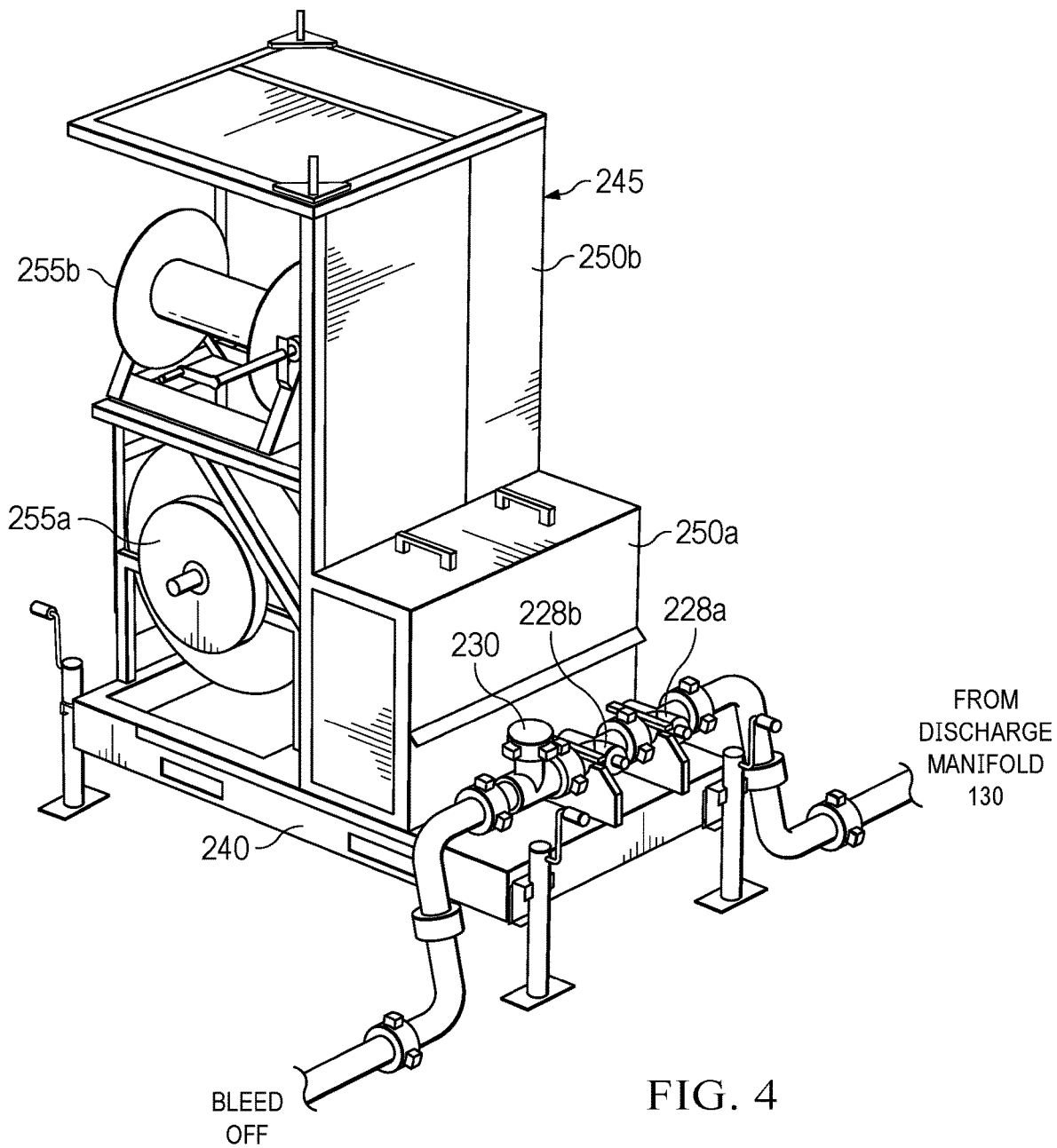
FIG. 4 is a perspective view of the equalizer of FIG. 3, according to one or more embodiments.
Figure 5:
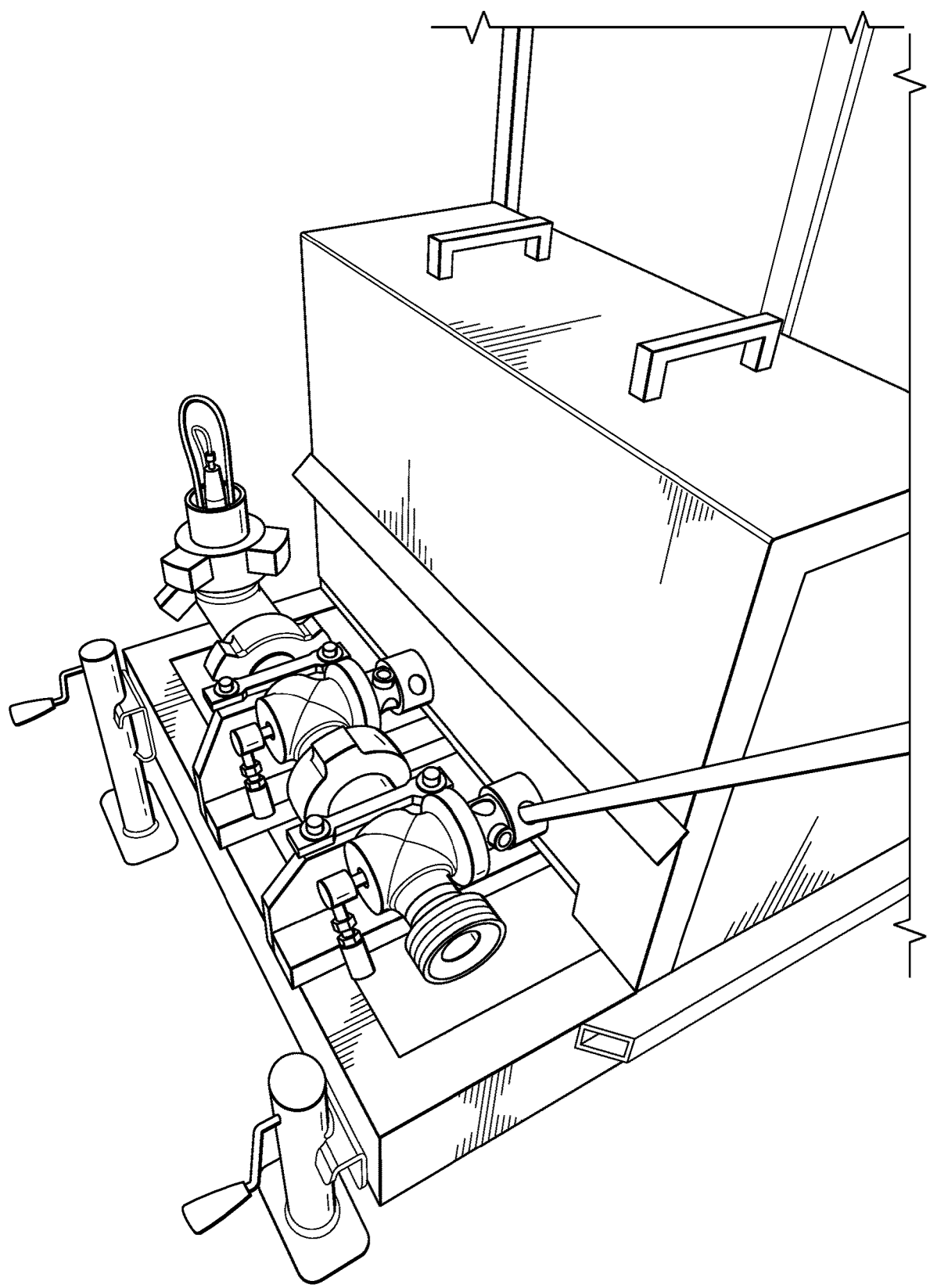
FIG. 5 is another perspective view of the equalizer of FIG. 3, according to one or more embodiments.

Referring to FIGS. 4 and 5, with continuing reference to FIG. 3, in an embodiment, the equalizer 152 also includes a skid 240 supporting a fixture 245 that holds the valves 228*a-b*, the choke 230, and the actuators 235*a-b* in place in an easily replaceable arrangement. The fixture 245 includes enclosures 250*a-b*. The enclosure 250*a* houses the actuators 235*a-b*. The enclosure 250*b* houses a pair of spools (a.k.a., reels) 255*a-b* for carrying hydraulic line(s), grease line(s), electrical power line(s), electrical communication lines(s), the like, or any combination thereof.

Figure 6:
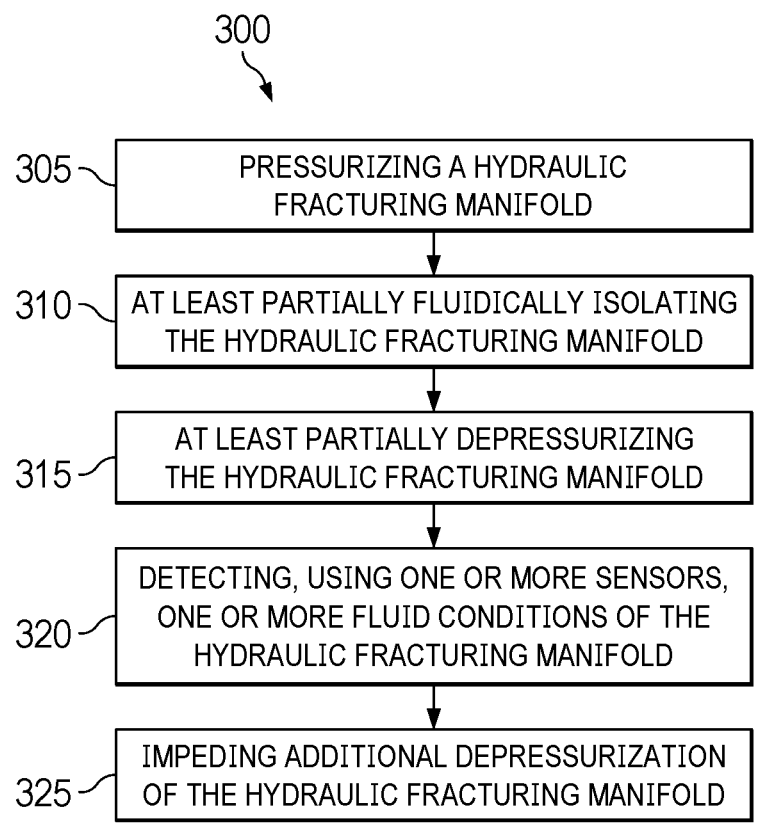
FIG. 6 is a flow diagram of a method for implementing one or more embodiments of the present disclosure.

Referring to FIG. 6, with continuing reference to FIGS. 1-5, in an embodiment, a method is generally referred to by the reference numeral 300 and includes: at a step 305, pressurizing a hydraulic fracturing manifold; at a step 310, at least partially fluidically isolating the hydraulic fracturing manifold; at a step 315, at least partially depressurizing the hydraulic fracturing manifold; at a step 320, detecting, using one or more sensors, one or more fluid conditions of the hydraulic fracturing manifold; and, at a step 325, impeding additional depressurization of the hydraulic fracturing manifold.

In one or more embodiments, the hydraulic fracturing manifold pressurized at the step 305 is operably coupled between a plurality of hydraulic fracturing pumps and one or more wells. For example, the hydraulic fracturing manifold pressurized at the step 305 may be operably coupled between the pump trucks 140aa through 140bc and the wells 105a through 105C+n. Thus, the hydraulic fracturing manifold pressurized at the step 305 may include the suction manifold 125, the discharge manifold 130, the zipper manifold 145, or any combination thereof. In one or more embodiments, the step 305 of pressurizing the hydraulic fracturing manifold includes communicating hydraulic fracturing fluid from the pump trucks 140aa through 140bc to the wells 105a through 105C+n via the discharge manifold 130 and the zipper manifold 145.

In one or more embodiments, the step 310 of at least partially fluidically isolating the hydraulic fracturing manifold includes closing one or more valves operably coupled between the hydraulic fracturing manifold and corresponding one(s) of the one or more wells. For example, the step 310 of at least partially fluidically isolating the hydraulic fracturing manifold may include closing one or more valves of the frac legs 150A through 150C+n. In addition, or instead, in one or more embodiments, the step 310 of at least partially fluidically isolating the hydraulic fracturing manifold includes closing a plurality of valves operably coupled between the hydraulic fracturing manifold and corresponding ones of the plurality of hydraulic fracturing pumps. For example the step 310 of at least partially fluidically isolating the hydraulic fracturing manifold may include closing one or more valves operably associated with the missile 122 (including the suction manifold 125 and the discharge manifold 130) and/or the swap stations 135aa though 135bc.

In one or more embodiments, the step 315 of at least partially depressurizing the hydraulic fracturing manifold includes opening one or more valves, and receiving fluid flow from the hydraulic fracturing manifold through the one or more valves. For example, the step 315 of at least partially depressurizing the hydraulic fracturing manifold may include opening one or more valves of the equalizer 152, such as the valves 228a-b, and receiving fluid flow from the hydraulic fracturing manifold through the valves 228a-b. In one more embodiments, grease is communicated to at least one of the one or more valves before, during, or after opening the one or more valves. Additionally, in one or more embodiments, the step 315 of at least partially depressurizing the hydraulic fracturing manifold includes receiving fluid flow from the hydraulic fracturing manifold through a choke, such as the choke 230.

In one or more embodiments, the one or more sensors used at the step 320 to detect the one or more fluid conditions of the hydraulic fracturing manifold may be or include the sensor 171, the sensor 171', the sensor 205, the sensor 226, or any combination thereof, and the one or more fluid conditions may be or include one or more fluid pressure conditions. However, although described herein as fluid pressure sensors, the sensors 171, 171', 205, 226, or and combination thereof may additionally, or alternatively, be or include other sensor(s) such as, for example, fluid flow sensor(s), and the one or more fluid conditions may be or include one or more fluid flow conditions. In one or more embodiments, the step 320 of detecting, using the one or more sensors, the one or more fluid conditions of the hydraulic fracturing manifold is executed while the hydraulic fracturing manifold is at least partially depressurized at the step 315.

In one or more embodiments, the step 325 of impeding additional depressurization of the hydraulic fracturing manifold includes closing, or at least partially closing, the one or more valves of the equalizer 152, such as the valves 228a-b. In one or more embodiments, the step 325 of impeding additional depressurization of the hydraulic fracturing manifold is executed based on detecting the one or more fluid conditions of the hydraulic fracturing manifold using the one or more sensors at the step 320.

Figure 7:
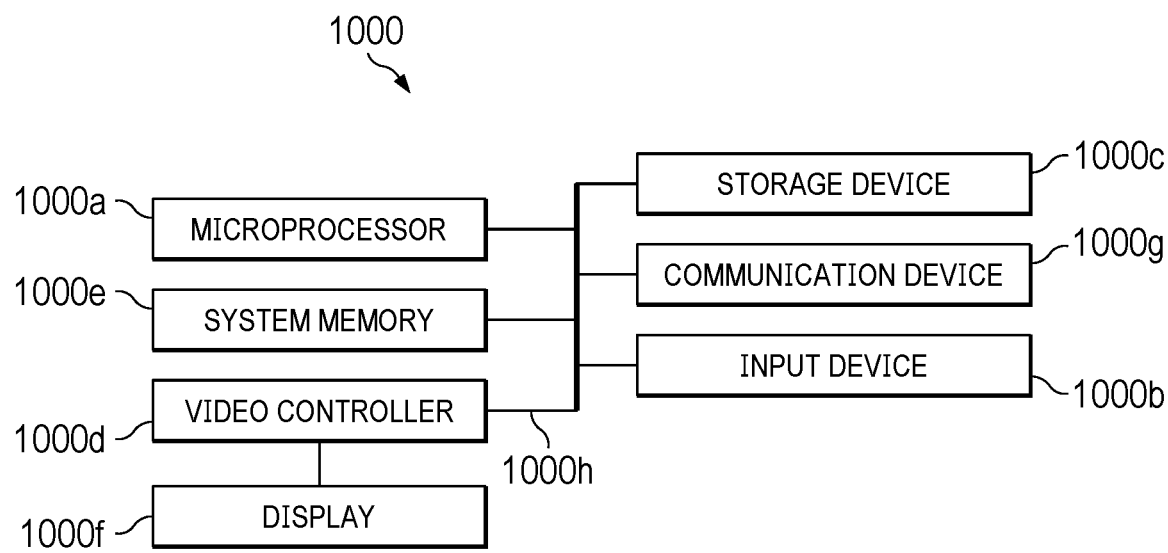
FIG. 7 is a diagrammatic illustration of a computing node for implementing one or more embodiments of the present disclosure.

Referring to FIG. 7, with continuing reference to FIGS. 1 through 6, an illustrative node 1000 for implementing one or more of the embodiments of one or more of the controller(s) (e.g., the controller 156, the controller 220, or both), element(s), apparatus, system(s) (e.g., the hydraulic fracturing system 100 and/or the hot swappable fracturing pump system 158), method(s), step(s), and/or sub-step(s), or any combination thereof, described above and/or illustrated in FIGS. 1 through 6 is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In one or more embodiments, the storage device 1000c may include a hard drive, CD-ROM, optical drive, any other form of storage device and/or any combination thereof. In one or more embodiments, the storage device 1000c may include, and/or be capable of receiving, a CD-ROM, DVD-ROM, or any other form of non-transitory computer-readable medium that may contain executable instructions. In one or more embodiments, the communication device 1000g may include a modem, network card, or any other device to enable the node 1000 to communicate with other node(s). In one or more embodiments, the node and the other node(s) represent a plurality of interconnected (whether by intranet or Internet) computer systems, including without limitation, personal computers, mainframes, PDAs, smartphones and cell phones.

In one or more embodiments, one or more of the embodiments described above and/or illustrated in FIGS. 1 through 6 include at least the node 1000 and/or components thereof, and/or one or more nodes that are substantially similar to the node 1000 and/or components thereof. In one or more embodiments, one or more of the above-described components of the node 1000 and/or the embodiments described above and/or illustrated in FIGS. 1 through 6 include respective pluralities of same components.

In one or more embodiments, one or more of the embodiments described above and/or illustrated in FIGS. 1 through 6 include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in one or more embodiments pulls real-time information from one or more servers, automatically refreshing with latest information at a predetermined time increment; or any combination thereof.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable an embodiment of the present disclosure. In an embodiment, a data structure may provide an organization of data, or an organization of executable code.

In one or more embodiments, any networks and/or one or more portions thereof may be designed to work on any specific architecture. In an embodiment, one or more portions of any networks may be executed on a single computer, local area networks, client-server networks, wide area networks, internets, hand-held and other portable and wireless devices and networks.

In one or more embodiments, a database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In an embodiment, the data contained in the location of a character file can be mapped to a field in a second table. In one or more embodiments, the physical location of the database is not limiting, and the database may be distributed. In an embodiment, the database may exist remotely from the server, and run on a separate platform. In an embodiment, the database may be accessible across the Internet. In one or more embodiments, more than one database may be implemented.

In one or more embodiments, a plurality of instructions stored on a non-transitory computer readable medium may be executed by one or more processors to cause the one or more processors to carry out or implement in whole or in part one or more of the embodiments of one or more of the controller(s) (e.g., the controller 156, the controller 220, or both), element(s), apparatus, system(s) (e.g., the hydraulic fracturing system 100 and/or the hot swappable fracturing pump system 158), method(s), step(s), and/or sub-step(s), or any combination thereof, described above and/or illustrated in FIGS. 1 through 6. In one or more embodiments, such a processor may include one or more of the microprocessor 1000a, any processor(s) that are part of the components of the hydraulic fracturing system 100 and/or the hot swappable fracturing pump system 158, such as, for example, the controller 156, the controller 220, and/or any combination thereof, and such a computer readable medium may be distributed among one or more components of the system. In one or more embodiments, such a processor may execute the plurality of instructions in connection with a virtual computer system. In one or more embodiments, such a plurality of instructions may communicate directly with the one or more processors, and/or ay interact with one or more operating systems, middleware, firmware, other applications, and/or any combination thereof, to cause the one or more processors to execute the instructions.

A system has been disclosed. The system generally includes: one or more valves operably coupled to a hydraulic fracturing manifold, wherein the one or more valves are openable to receive fluid flow therethrough from the hydraulic fracturing manifold, thereby at least partially depressurizing the hydraulic fracturing manifold, and wherein the hydraulic fracturing manifold is operably coupled between a plurality of hydraulic fracturing pumps and one or more wells; one or more sensors operably coupled to the hydraulic fracturing manifold, wherein the one or more sensors are configured to detect one or more fluid conditions of the hydraulic fracturing manifold while the hydraulic fracturing manifold is at least partially depressurized; and one or more controllers configured to close, or at least partially close, based on detection of the one or more fluid conditions of the hydraulic fracturing manifold by the one or more sensors, the one or more valves, thereby impeding additional depressurization of the hydraulic fracturing manifold. In one or more embodiments, the system further includes a choke operably coupled to the hydraulic fracturing manifold, wherein the choke is configured to receive fluid flow therethrough from the hydraulic fracturing manifold when the one or more valves are opened to thereby at least partially depressurize the hydraulic fracturing manifold. In one or more embodiments, the system further includes a grease system operably coupled to the one or more valves, wherein the one or more controllers are further configured to cause the grease system to communicate grease to at least one of the one or more valves before, during, or after opening said valve(s). In one or more embodiments, the system further includes the hydraulic fracturing manifold. In one or more embodiments, the system further includes one or more additional valves operably coupled between the hydraulic fracturing manifold and corresponding one(s) of the one or more wells, wherein the one or more additional valves are closable to at least partially fluidically isolate the hydraulic fracturing manifold before the one or more valves are opened to thereby at least partially depressurize the hydraulic fracturing manifold. In one or more embodiments, the system further includes a plurality of additional valves operably coupled between the hydraulic fracturing manifold and corresponding ones of the plurality of hydraulic fracturing pumps, wherein the plurality of additional valves are closable to at least partially fluidically isolate the hydraulic fracturing manifold before the one or more valves are opened to thereby at least partially depressurize the hydraulic fracturing manifold.

A method has also been disclosed. The method generally includes: at least partially depressurizing a hydraulic fracturing manifold, said hydraulic fracturing manifold being operably coupled between a plurality of hydraulic fracturing pumps and one or more wells, wherein at least partially depressurizing the hydraulic fracturing manifold includes: opening one or more valves, and receiving fluid flow from the hydraulic fracturing manifold through the one or more valves; while at least partially depressurizing the hydraulic fracturing manifold, detecting, using one or more sensors, one or more fluid conditions of the hydraulic fracturing manifold; and based on detecting the one or more fluid conditions of the hydraulic fracturing manifold using the one or more sensors, impeding additional depressurization of the hydraulic fracturing manifold, wherein impeding additional depressurization of the hydraulic fracturing manifold includes closing, or at least partially closing, the one or more valves. In one or more embodiments, at least partially depressurizing the hydraulic fracturing manifold further includes receiving fluid flow from the hydraulic fracturing manifold through a choke. In one or more embodiments, the method further includes communicating grease to at least one of the one or more valves before, during, or after opening the one or more valves. In one or more embodiments, the method further includes pressurizing the hydraulic fracturing manifold before at least partially depressurizing the hydraulic fracturing manifold. In one or more embodiments, pressurizing the hydraulic fracturing manifold includes communicating hydraulic fracturing fluid from the plurality of hydraulic fracturing pumps to the one or more wells via the hydraulic fracturing manifold. In one or more embodiments, the method further includes at least partially fluidically isolating the hydraulic fracturing manifold before at least partially depressurizing the hydraulic fracturing manifold. In one or more embodiments, at least partially fluidically isolating the hydraulic fracturing manifold includes closing one or more additional valves operably coupled between the hydraulic fracturing manifold and corresponding one(s) of the one or more wells. In one or more embodiments, at least partially fluidically isolating the hydraulic fracturing manifold includes closing a plurality of additional valves operably coupled between the hydraulic fracturing manifold and corresponding ones of the plurality of hydraulic fracturing pumps.

A non-transitory computer readable medium has also been disclosed. The non-transitory computer readable medium generally has stored thereon computer-readable instructions executable by one or more processors to perform operations which include: at least partially depressurizing a hydraulic fracturing manifold, said hydraulic fracturing manifold being operably coupled between a plurality of hydraulic fracturing pumps and one or more wells, wherein at least partially depressurizing the hydraulic fracturing manifold includes: opening one or more valves, and receiving fluid flow from the hydraulic fracturing manifold through the one or more valves; while at least partially depressurizing the hydraulic fracturing manifold, detecting, using one or more sensors, one or more fluid conditions of the hydraulic fracturing manifold; and based on detecting the one or more fluid conditions of the hydraulic fracturing manifold using the one or more sensors, impeding additional depressurization of the hydraulic fracturing manifold, wherein impeding additional depressurization of the hydraulic fracturing manifold includes closing, or at least partially closing, the one or more valves. In one or more embodiments, at least partially depressurizing the hydraulic fracturing manifold further includes receiving fluid flow from the hydraulic fracturing manifold through a choke. In one or more embodiments, the operations further include communicating grease to at least one of the one or more valves before, during, or after opening the one or more valves. In one or more embodiments, the operations further include pressurizing the hydraulic fracturing manifold before at least partially depressurizing the hydraulic fracturing manifold. In one or more embodiments, pressurizing the hydraulic fracturing manifold includes communicating hydraulic fracturing fluid from the plurality of hydraulic fracturing pumps to the one or more wells via the hydraulic fracturing manifold. In one or more embodiments, the operations further include at least partially fluidically isolating the hydraulic fracturing manifold before at least partially depressurizing the hydraulic fracturing manifold. In one or more embodiments, at least partially fluidically isolating the hydraulic fracturing manifold includes closing one or more additional valves operably coupled between the hydraulic fracturing manifold and corresponding one(s) of the one or more wells. In one or more embodiments, at least partially fluidically isolating the hydraulic fracturing manifold includes closing a plurality of additional valves operably coupled between the hydraulic fracturing manifold and corresponding ones of the plurality of hydraulic fracturing pumps.

Another system has also been disclosed. The another system generally includes: one or more sensors operably coupled to a hydraulic fracturing manifold, wherein the one or more sensors are configured to detect one or more fluid conditions of the hydraulic fracturing manifold while the hydraulic fracturing manifold is at least partially depressurized, and wherein the hydraulic fracturing manifold is operably coupled between a plurality of hydraulic fracturing pumps and one or more wells; and one or more valves operably coupled to the hydraulic fracturing manifold, wherein the one or more valves are openable to receive fluid flow therethrough from the hydraulic fracturing manifold, thereby at least partially depressurizing the hydraulic fracturing manifold, and wherein the one or more valves are closable, or at least partially closable, based on detection of the one or more fluid conditions of the hydraulic fracturing manifold by the one or more sensors, to thereby impede additional depressurization of the hydraulic fracturing manifold. In one or more embodiments, the another system further includes a choke operably coupled to the hydraulic fracturing manifold and configured to receive fluid flow therethrough from the hydraulic fracturing manifold when the one or more valves are opened to thereby at least partially depressurize the hydraulic fracturing manifold. In one or more embodiments, the another system further includes a grease system operably coupled to the one or more valves and configured to communicate grease to at least one of the one or more valves before, during, or after opening said valve(s). In one or more embodiments, the another system of further includes the hydraulic fracturing manifold. In one or more embodiments, the another system further includes the plurality of hydraulic fracturing pumps, which are configured to pressurize the hydraulic fracturing manifold before the one or more valves are opened to thereby at least partially depressurize the hydraulic fracturing manifold. In one or more embodiments, the another system further includes the one or more wells, to which the plurality of hydraulic fracturing pumps are configured to communicate hydraulic fracturing fluid, via the hydraulic fracturing manifold, thereby pressurizing the hydraulic fracturing manifold. In one or more embodiments, the another system further includes one or more additional valves operably coupled between the hydraulic fracturing manifold and corresponding one(s) of the one or more wells, wherein the one or more additional valves are closable to at least partially fluidically isolate the hydraulic fracturing manifold before the one or more valves are opened to thereby at least partially depressurize the hydraulic fracturing manifold. In one or more embodiments, the another system further includes a plurality of additional valves operably coupled between the hydraulic fracturing manifold and corresponding ones of the plurality of hydraulic fracturing pumps, wherein the plurality of additional valves are closable to at least partially fluidically isolate the hydraulic fracturing manifold before the one or more valves are opened to thereby at least partially depressurize the hydraulic fracturing manifold.

It is understood that variations may be made in the foregoing without departing from the scope of the present disclosure.

In several embodiments, the elements and teachings of the various embodiments may be combined in whole or in part in some (or all) of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A system, comprising:
a hydraulic fracturing discharge manifold;
one or more valves operably coupled to the hydraulic fracturing discharge manifold,
wherein a plurality of additional valves are operably coupled between the hydraulic fracturing discharge manifold and corresponding ones of a plurality of hydraulic fracturing pumps,
wherein the plurality of additional valves are closable to fluidically isolate the hydraulic fracturing discharge manifold from the plurality of hydraulic fracturing pumps,
wherein the one or more valves are openable when the plurality of additional valves are closed to receive fluid flow therethrough from the hydraulic fracturing discharge manifold, thereby at least partially depressurizing the hydraulic fracturing discharge manifold to a surface location when the hydraulic fracturing discharge manifold is fluidically isolated from the plurality of hydraulic fracturing pumps, and
wherein the hydraulic fracturing discharge manifold is operably coupled between the plurality of hydraulic fracturing pumps and one or more wells;
one or more sensors operably coupled to the hydraulic fracturing discharge manifold,
wherein the one or more sensors are configured to detect one or more fluid conditions of the hydraulic fracturing discharge manifold while the hydraulic fracturing discharge manifold is at least partially depressurized to the surface location;
and
one or more controllers configured to close, or at least partially close, based on detection of the one or more fluid conditions of the hydraulic fracturing discharge manifold by the one or more sensors, the one or more valves, thereby impeding additional depressurization of the hydraulic fracturing discharge manifold to the surface location.

2. The system of claim 1, further comprising a choke operably coupled to the hydraulic fracturing discharge manifold,
wherein the choke is configured to receive fluid flow therethrough from the hydraulic fracturing discharge manifold when the one or more valves are opened to thereby at least partially depressurize the hydraulic fracturing discharge manifold to the surface location.

3. The system of claim 1, further comprising a grease system operably coupled to the one or more valves,
wherein the one or more controllers are further configured to cause the grease system to communicate grease to at least one of the one or more valves before, during, or after opening said valve(s).

4. The system of claim 1, further comprising one or more additional valves operably coupled between the hydraulic fracturing discharge manifold and corresponding one(s) of the one or more wells,
wherein the one or more additional valves are closable to at least partially fluidically isolate the hydraulic fracturing discharge manifold before the one or more valves are opened to thereby at least partially depressurize the hydraulic fracturing discharge manifold to the surface location.

5. A method, comprising:
at least partially depressurizing a hydraulic fracturing discharge manifold to a surface location when the hydraulic fracturing discharge manifold is fluidically isolated from a plurality of hydraulic fracturing pumps, said hydraulic fracturing discharge manifold being operably coupled between the plurality of hydraulic fracturing pumps and one or more wells,
wherein at least partially depressurizing the hydraulic fracturing discharge manifold to the surface location when the hydraulic fracturing discharge manifold is fluidically isolated from the plurality of hydraulic fracturing pumps comprises:
opening one or more valves, operably coupled to the hydraulic fracturing discharge manifold when a plurality of additional valves are closed, the plurality of additional valves being:
operably coupled between the hydraulic fracturing discharge manifold and corresponding ones of the plurality of hydraulic fracturing pumps; and
closable to fluidically isolate the hydraulic fracturing discharge manifold from the plurality of hydraulic fracturing pumps,
and
receiving fluid flow to the surface location from the hydraulic fracturing discharge manifold through the one or more valves;
while at least partially depressurizing the hydraulic fracturing discharge manifold to the surface location, detecting, using one or more sensors, one or more fluid conditions of the hydraulic fracturing discharge manifold; and
based on detecting the one or more fluid conditions of the hydraulic fracturing discharge manifold using the one or more sensors, impeding additional depressurization of the hydraulic fracturing discharge manifold to the surface location,
wherein impeding additional depressurization of the hydraulic fracturing discharge manifold to the surface location comprises closing, or at least partially closing, the one or more valves.

6. The method of claim 5, wherein at least partially depressurizing the hydraulic fracturing discharge manifold to the surface location further comprises receiving fluid flow to the surface location from the hydraulic fracturing discharge manifold through a choke.

7. The method of claim 5, further comprising communicating grease to at least one of the one or more valves before, during, or after opening the one or more valves.

8. The method of claim 5, further comprising pressurizing the hydraulic fracturing discharge manifold before at least partially depressurizing the hydraulic fracturing discharge manifold to the surface location.

9. The method of claim 8, wherein pressurizing the hydraulic fracturing discharge manifold comprises communicating hydraulic fracturing fluid from the plurality of hydraulic fracturing pumps to the one or more wells via the hydraulic fracturing discharge manifold.

10. The method of claim 5, further comprising at least partially fluidically isolating the hydraulic fracturing discharge manifold before at least partially depressurizing the hydraulic fracturing discharge manifold to the surface location.

11. The method of claim 10, wherein at least partially fluidically isolating the hydraulic fracturing discharge manifold comprises closing one or more additional valves operably coupled between the hydraulic fracturing discharge manifold and corresponding one(s) of the one or more wells.

12. The method of claim 10, wherein at least partially fluidically isolating the hydraulic fracturing discharge manifold comprises closing the plurality of additional valves operably coupled between the hydraulic fracturing discharge manifold and the corresponding ones of the plurality of hydraulic fracturing pumps.

13. A non-transitory computer readable medium having stored thereon computer-readable instructions executable by one or more processors to perform operations which comprise:
at least partially depressurizing a hydraulic fracturing discharge manifold to a surface location when the hydraulic fracturing discharge manifold is fluidically isolated from a plurality of hydraulic fracturing pumps, said hydraulic fracturing discharge manifold being operably coupled between the plurality of hydraulic fracturing pumps and one or more wells,
wherein at least partially depressurizing the hydraulic fracturing discharge manifold to the surface location when the hydraulic fracturing discharge manifold is fluidically isolated from the plurality of hydraulic fracturing pumps comprises:
opening one or more valves operably coupled to the hydraulic fracturing discharge manifold when a plurality of additional valves are closed, the plurality of additional valves being:
operably coupled between the hydraulic fracturing discharge manifold and corresponding ones of the plurality of hydraulic fracturing pumps; and
closable to fluidically isolate the hydraulic fracturing discharge manifold from the plurality of hydraulic fracturing pumps,
and
receiving fluid flow to the surface location from the hydraulic fracturing discharge manifold through the one or more valves;
while at least partially depressurizing the hydraulic fracturing discharge manifold to the surface location, detecting, using one or more sensors, one or more fluid conditions of the hydraulic fracturing discharge manifold; and
based on detecting the one or more fluid conditions of the hydraulic fracturing discharge manifold using the one or more sensors, impeding additional depressurization of the hydraulic fracturing discharge manifold to the surface location,
wherein impeding additional depressurization of the hydraulic fracturing discharge manifold to the surface location comprises closing, or at least partially closing, the one or more valves.

14. The non-transitory computer readable medium of claim 13, wherein at least partially depressurizing the hydraulic fracturing discharge manifold to the surface location further comprises receiving fluid flow to the surface location from the hydraulic fracturing discharge manifold through a choke.

15. The non-transitory computer readable medium of claim 13, wherein the operations further comprise communicating grease to at least one of the one or more valves before, during, or after opening the one or more valves.

16. The non-transitory computer readable medium of claim 13, wherein the operations further comprise pressurizing the hydraulic fracturing discharge manifold before at least partially depressurizing the hydraulic fracturing discharge manifold to the surface location.

17. The non-transitory computer readable medium of claim 16, wherein pressurizing the hydraulic fracturing discharge manifold comprises communicating hydraulic fracturing fluid from the plurality of hydraulic fracturing pumps to the one or more wells via the hydraulic fracturing discharge manifold.

18. The non-transitory computer readable medium of claim 13, wherein the operations further comprise at least partially fluidically isolating the hydraulic fracturing discharge manifold before at least partially depressurizing the hydraulic fracturing discharge manifold to the surface location.

19. The non-transitory computer readable medium of claim 18, wherein at least partially fluidically isolating the hydraulic fracturing discharge manifold comprises closing one or more additional valves operably coupled between the hydraulic fracturing discharge manifold and corresponding one(s) of the one or more wells.

20. The non-transitory computer readable medium of claim 18, wherein at least partially fluidically isolating the hydraulic fracturing discharge manifold comprises closing the plurality of additional valves operably coupled between the hydraulic fracturing discharge manifold and the corresponding ones of the plurality of hydraulic fracturing pumps.

21. A system, comprising:
one or more sensors operably coupled to a hydraulic fracturing discharge manifold,
wherein the one or more sensors are configured to detect one or more fluid conditions of the hydraulic fracturing discharge manifold while the hydraulic fracturing discharge manifold is at least partially depressurized to a surface location, and
wherein the hydraulic fracturing discharge manifold is operably coupled between a plurality of hydraulic fracturing pumps and one or more wells;
and
one or more valves operably coupled to the hydraulic fracturing discharge manifold,
wherein a plurality of additional valves are operably coupled between the hydraulic fracturing discharge manifold and corresponding ones of the plurality of hydraulic fracturing pumps,
wherein the plurality of additional valves are closable to fluidically isolate the hydraulic fracturing discharge manifold from the plurality of hydraulic fracturing pumps,
wherein the one or more valves are openable when the plurality of additional valves are closed to receive fluid flow therethrough from the hydraulic fracturing discharge manifold, thereby at least partially depressurizing the hydraulic fracturing discharge manifold to the surface location when the hydraulic fracturing discharge manifold is fluidically isolated from the plurality of hydraulic fracturing pumps, and
wherein the one or more valves are closable, or at least partially closable, based on detection of the one or more fluid conditions of the hydraulic fracturing discharge manifold by the one or more sensors, to thereby impede additional depressurization of the hydraulic fracturing discharge manifold to the surface location.

22. The system of claim 21, further comprising a choke operably coupled to the hydraulic fracturing discharge manifold and configured to receive fluid flow therethrough from the hydraulic fracturing discharge manifold when the one or more valves are opened to thereby at least partially depressurize the hydraulic fracturing discharge manifold to the surface location.

23. The system of claim 21, further comprising a grease system operably coupled to the one or more valves and configured to communicate grease to at least one of the one or more valves before, during, or after opening said valve(s).

24. The system of claim 21, further comprising the hydraulic fracturing discharge manifold.

25. The system of claim 24, further comprising the plurality of hydraulic fracturing pumps, which are configured to pressurize the hydraulic fracturing discharge manifold before the one or more valves are opened to thereby at least partially depressurize the hydraulic fracturing discharge manifold to the surface location.

26. The system of claim 25, further comprising the one or more wells, to which the plurality of hydraulic fracturing pumps are configured to communicate hydraulic fracturing fluid, via the hydraulic fracturing discharge manifold, thereby pressurizing the hydraulic fracturing discharge manifold.

27. The system of claim 24, further comprising one or more additional valves operably coupled between the hydraulic fracturing discharge manifold and corresponding one(s) of the one or more wells,
wherein the one or more additional valves are closable to at least partially fluidically isolate the hydraulic fracturing discharge manifold before the one or more valves are opened to thereby at least partially depressurize the hydraulic fracturing discharge manifold to the surface location.

28. The system of claim 24, further comprising the plurality of additional valves operably coupled between the hydraulic fracturing discharge manifold and the corresponding ones of the plurality of hydraulic fracturing pumps.

* * * * *